(12) United States Patent
Andou et al.

(10) Patent No.: US 10,661,624 B2
(45) Date of Patent: May 26, 2020

(54) SUSPENSION DEVICE FOR VEHICLE

(71) Applicant: MAZDA MOTOR CORPORATION, Hiroshima (JP)

(72) Inventors: Fumitaka Andou, Hatsukaichi (JP); Norio Asano, Hiroshima (JP); Hiroshi Tanaka, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 38 days.

(21) Appl. No.: 16/020,185

(22) Filed: Jun. 27, 2018

(65) Prior Publication Data
US 2019/0070919 A1 Mar. 7, 2019

(30) Foreign Application Priority Data

Sep. 4, 2017 (JP) .................................. 2017-169100

(51) Int. Cl.
| | |
|---|---|
| *B60G 3/20* | (2006.01) |
| *B60G 7/00* | (2006.01) |
| *B60G 21/02* | (2006.01) |
| *B60G 21/055* | (2006.01) |
| *B62D 7/18* | (2006.01) |

(52) U.S. Cl.
CPC ............... *B60G 3/202* (2013.01); *B60G 3/20* (2013.01); *B60G 7/008* (2013.01); *B60G 21/026* (2013.01); *B60G 21/055* (2013.01); *B62D 7/18* (2013.01); *B60G 2200/144* (2013.01); *B60G 2200/1442* (2013.01); *B60G 2202/135* (2013.01); *B60G 2204/148* (2013.01); *B60G 2204/41* (2013.01); *B60G 2204/416* (2013.01); *B60G 2204/421* (2013.01)

(58) Field of Classification Search
CPC .......... B60G 3/202; B60G 3/20; B60G 7/008; B60G 21/026; B60G 21/055; B60G 2204/421; B60G 2200/144; B60G 2204/148; B60G 2204/41; B60G 2204/416; B60G 2200/1442; B60G 2202/135; B62D 7/12
USPC .................................................. 280/124.135
See application file for complete search history.

(56) References Cited

U.S. PATENT DOCUMENTS

| | | | | |
|---|---|---|---|---|
| 4,570,968 A | * | 2/1986 | Mukai ..................... | B60G 7/001 280/124.145 |
| 4,798,396 A | * | 1/1989 | Minakawa ............... | B60G 3/26 280/124.138 |

(Continued)

FOREIGN PATENT DOCUMENTS

| | | |
|---|---|---|
| JP | H06-072116 A | 3/1994 |
| JP | H07-246815 A | 9/1995 |

(Continued)

*Primary Examiner* — Paul N Dickson
*Assistant Examiner* — Kurtis Nielson
(74) *Attorney, Agent, or Firm* — Studebaker & Brackett PC

(57) ABSTRACT

A suspension device for a vehicle of the present invention comprises a knuckle supporting a wheel, an upper arm vertically rotatably connected to a vehicle body and pivotally supporting an upper portion of the knuckle, a lower arm provided below the upper arm and vertically rotatably connected to the vehicle body, and a coupling rod coupling the upper arm and the lower arm, wherein the coupling rod is configured to slant in a vehicle longitudinal direction and be rotatably connected to the upper arm and the lower arm, respectively.

12 Claims, 12 Drawing Sheets

(56) References Cited

U.S. PATENT DOCUMENTS

| | | | | | |
|---|---|---|---|---|---|
| 4,964,651 | A | * | 10/1990 | Kubo | B60G 3/20 280/124.109 |
| 5,116,076 | A | * | 5/1992 | Moll | B62D 7/146 280/124.138 |
| 5,176,398 | A | * | 1/1993 | Kanai | B60G 3/202 280/124.143 |
| 5,498,019 | A | * | 3/1996 | Adato | B60G 3/26 280/124.136 |
| 5,782,484 | A | * | 7/1998 | Kuhn, Jr. | B60G 3/265 267/248 |
| 6,767,022 | B1 | * | 7/2004 | Chevalier | B60G 3/20 280/124.136 |
| 7,461,851 | B2 | * | 12/2008 | Yamamura | B60G 3/20 180/311 |
| 7,510,199 | B2 | * | 3/2009 | Nash | B60G 7/02 180/311 |
| 7,581,740 | B1 | * | 9/2009 | Stimely | B60G 3/20 280/124.136 |
| 8,827,288 | B2 | * | 9/2014 | Kuroda | B21D 53/88 280/124.107 |
| 9,030,033 | B2 | * | 5/2015 | Yoo | B60G 7/02 180/165 |
| 2010/0244395 | A1 | * | 9/2010 | Sugiura | B60G 21/0551 280/124.107 |
| 2018/0001723 | A1 | * | 1/2018 | Andou | B60G 3/26 |

FOREIGN PATENT DOCUMENTS

| JP | H07-323712 A | | 12/1995 |
|---|---|---|---|
| JP | 08332819 A | * | 12/1996 |

* cited by examiner

SUSPENSION DEVICE FOR VEHICLE

BACKGROUND OF THE INVENTION

The present invention relates to a suspension device for a vehicle which is applicable to a vehicle, such as an automotive vehicle, and in particular relates to a double wishbone type of suspension device.

A conventional double wishbone type of suspension device comprises a knuckle which supports a wheel and a pair of upper-and-lower arms (an upper arm and a lower arm) which respectively support an upper portion and a lower portion of the knuckle. This type of suspension device has a defect that the upper arm is displaced forwardly and the lower arm is displaced rearwardly such that these arms are displaced in an opposite direction during braking, so that the caster rigidity of the suspension cannot be secured.

Meanwhile, resilient bushes are provided between respective vehicle-body connection portions of the upper and lower arms and a vehicle body. Herein, by designing the rubber bushes to be hard, the upper arm and the lower arm can be suppressed from being displaced in the opposite direction of the vehicle longitudinal direction, so that the caster rigidity of the suspension can be secured.

However, the above-described design causes the rubber bushes to be hard suppressing the upper arm and the lower arm from being displaced in the vehicle longitudinal direction, so that the longitudinal compliance of the suspension is suppressed improperly. Consequently, there is a defect that a longitudinal element of impact which is generated when the vehicle rides over projections is not so sufficiently absorbed by the longitudinal compliance of the suspension that the ride quality of the vehicle is deteriorated.

Japanese Patent Laid-Open Publication No. H07-246815 discloses a suspension device for a vehicle as a technology of solving the above-described defects (i.e., the technology of compatibly securing the caster rigidity and the longitudinal compliance of the suspension).

In the suspension device for the vehicle of the above-described patent document, the upper arm and the lower arm are respectively provided with two vehicle-body connection portions which are spaced apart from each other in the vehicle longitudinal direction. The two vehicle-body connection portions of the upper arm and the two vehicle-body connection portions of the lower arm are integrally connected by a facial-shaped connecting member. This connecting member suppresses the upper arm and the lower arm from being displaced in the opposite longitudinal direction, not suppressing these arms from being displaced in the same longitudinal direction, so that the caster-rigidity securement and the longitudinal-compliance securement are compatibly attained.

In the suspension device for the vehicle of the above-described patent document, however, the above-described connecting member integrally connects the vehicle-body connection portions of the upper arm and the vehicle-body connection portions of the lower arm. Therefore, the upper arm and the lower arm are not allowed to rotate in a vertical direction freely, so that the suspension function may be damaged.

SUMMARY OF THE INVENTION

Accordingly, an object of the present invention is to provide a suspension device for a vehicle which can compatibly attain the longitudinal compliance securement and the caster rigidity securement without damaging the suspension function.

The present invention is a double wishbone type of suspension device for a vehicle, comprising a knuckle supporting a wheel, an upper arm vertically rotatably connected to a vehicle body and pivotally supporting an upper portion of the knuckle, a lower arm provided below the upper arm and vertically rotatably connected to the vehicle body, and a coupling rod coupling the upper arm and the lower arm, wherein the coupling rod is configured to slant in a vehicle longitudinal direction and be rotatably connected to the upper arm and the lower arm, respectively.

According to the present invention, since the coupling rod configured as described above is provided, the longitudinal-compliance securement and the caster-rigidity securement can be compatibly attained without damaging the suspension function.

More specifically, since the coupling rod coupling the upper arm and the lower arm is configured to slant in the vehicle longitudinal direction, the upper arm and the lower arm can be suppressed from being displaced in the opposite direction of the vehicle longitudinal direction during the braking by the coupling rod, so that the caster rigidity can be secured. Further, since it is unnecessary that the rubber bushes which are generally provided between the vehicle body and the vehicle-body connection portions of the upper and lower arms are designed to be hard, the longitudinal compliance of the suspension which is provided by the rubber bushes can be secured.

Moreover, since the coupling rod is rotatably connected to the upper arm and the lower arm, respectively, the coupling rod can couple the upper arm and the lower arm without damaging the vertical rotation of the upper arm and the lower arm as the suspension function.

In an embodiment of the present invention, the coupling rod is connected to the upper arm and the lower arm, respectively, via a ball joint, a pillow ball, or a rubber bush.

According to this embodiment, a movable range of the connection portion of the coupling rod to the arm (the upper arm, the lower arm) can be enlarged. That is, the connection portion of the coupling rod can be moved not only around an axial line of the connection portion but also in an axial direction of the connection portion. Accordingly, the flexibility of a connection position or a connection angle where the coupling rod is connected to the arm can be improved.

In another embodiment of the present invention, the coupling rod is configured to couple the upper arm and the lower arm in a slant state where a forward side, in a vehicle longitudinal direction, thereof is located at a higher level than a rearward side, in the vehicle longitudinal direction, thereof.

According to this embodiment, a tensional load, not a bending load, can be applied to the coupling rod during the braking where the upper arm and the lower arm are displaced in the opposite direction of the vehicle longitudinal direction, so that weight reduction of the coupling rod can be attained.

In another embodiment of the present invention, the upper arm comprises a forward-side arm portion and a rearward-side arm portion, and a forward end portion of the coupling rod is connected to a forward side of the forward-side arm portion of the upper arm.

According to this embodiment, the coupling rod coupling the upper arm and the lower arm can be configured to slant in the vehicle longitudinal direction more properly, so that the upper arm and the lower arm can be effectively suppressed from being displaced in the opposite direction of the vehicle longitudinal direction by the coupling rod.

In another embodiment of the present invention, the lower arm comprises a forward-side arm portion and a rearward-side arm portion, and a rearward end portion of the coupling rod is connected to a rearward side of the rearward-side arm portion of the lower arm.

According to this embodiment, the coupling rod coupling the upper arm and the lower arm can be configured to slant in the vehicle longitudinal direction more properly, so that the upper arm and the lower arm can be effectively suppressed from being displaced in the opposite direction of the vehicle longitudinal direction by the coupling rod.

In another embodiment of the present invention, the coupling rod is configured to couple the upper arm and the lower arm in a slant state where a forward side, in a vehicle longitudinal direction, thereof is located at a lower level than a rearward side, in the vehicle longitudinal direction, thereof.

According to this embodiment, a compressive load can be applied to the coupling rod during the braking where the upper arm and the lower arm are displaced in the opposite direction of the vehicle longitudinal direction, so that weight reduction of the coupling rod can be attained.

Herein, according to this embodiment, it is preferable that a rearward end portion of the coupling rod be connected to a rearward side of the rearward-side arm portion of the upper arm. Further, it is preferable that a forward end portion of the coupling rod be connected to a forward side of the forward-side arm portion of the lower arm.

In another embodiment of the present invention, the upper arm is provided with a coupling-rod connection portion where the connecting rod is connected, the coupling-rod connection portion of the upper arm is configured to project substantially horizontally from the upper arm, the lower arm is provided with a coupling-rod connection portion where the connecting rod is connected, the coupling-rod connection portion of the lower arm is configured to project substantially horizontally from the lower arm, and the coupling rod is configured substantially in a linear-bar shape, one end portion of which is bent toward the upper arm and the other end portion of which is bent toward the lower arm.

According to this embodiment, by configuring the coupling rod such that its both end portions are bent as described above, the both end portions of the coupling rod can be arranged substantially in parallel to a forward end face of the coupling-rod connection portion of the upper-arm side and a rearward end face of the coupling-rod connection portion of the lower-arm side. Thereby, a connection angle where the both end portions of the coupling rod are connected to the both end faces of the coupling-rod connection portions can be made to fall in an appropriate range.

In another embodiment of the present invention, the knuckle is provided with a steering-rod connection portion where a steering rod for rotating the knuckle in a vehicle lateral direction is connected, and a coupling-rod connection portion of the lower arm where the coupling rod is connected is arranged on an opposite side, in a vehicle longitudinal direction, to the steering-rod connection portion relative to a center, in the vehicle longitudinal direction, of the knuckle.

According to this embodiment, since the coupling-rod connection portion is arranged on the opposite side, in the vehicle longitudinal direction, to the steering-rod connection portion relative to the center, in the vehicle longitudinal direction, of the knuckle, the coupling rod can be connected to the lower arm without interfering with the steering rod.

In another embodiment of the present invention, the lower arm is provided with a stabilizer connection portion where a stabilizer is connected, and a coupling-rod connection portion of the lower arm where the coupling rod is connected is arranged on an opposite side, in the vehicle longitudinal direction, to the stabilizer connection portion of the lower arm.

According to this embodiment, since the coupling-rod connection portion is arranged on the opposite side, in the vehicle longitudinal direction, to the stabilizer connection portion of the lower arm, the coupling rod can be connected to the lower arm without interfering with the stabilizer.

In another embodiment of the present invention, the coupling rod is connected to respective portions of the upper arm and the lower arm which are positioned more closely to a vehicle-body side than a knuckle side, respectively.

According to this embodiment, it can be prevented that the weight of the coupling rod improperly influences a smooth vertical move of the respective arms.

Other features, aspects, and advantages of the present invention will become apparent from the following description which refers to the accompanying drawings.

DETAILED DESCRIPTION OF THE INVENTION

<Embodiment>

Figure 1:
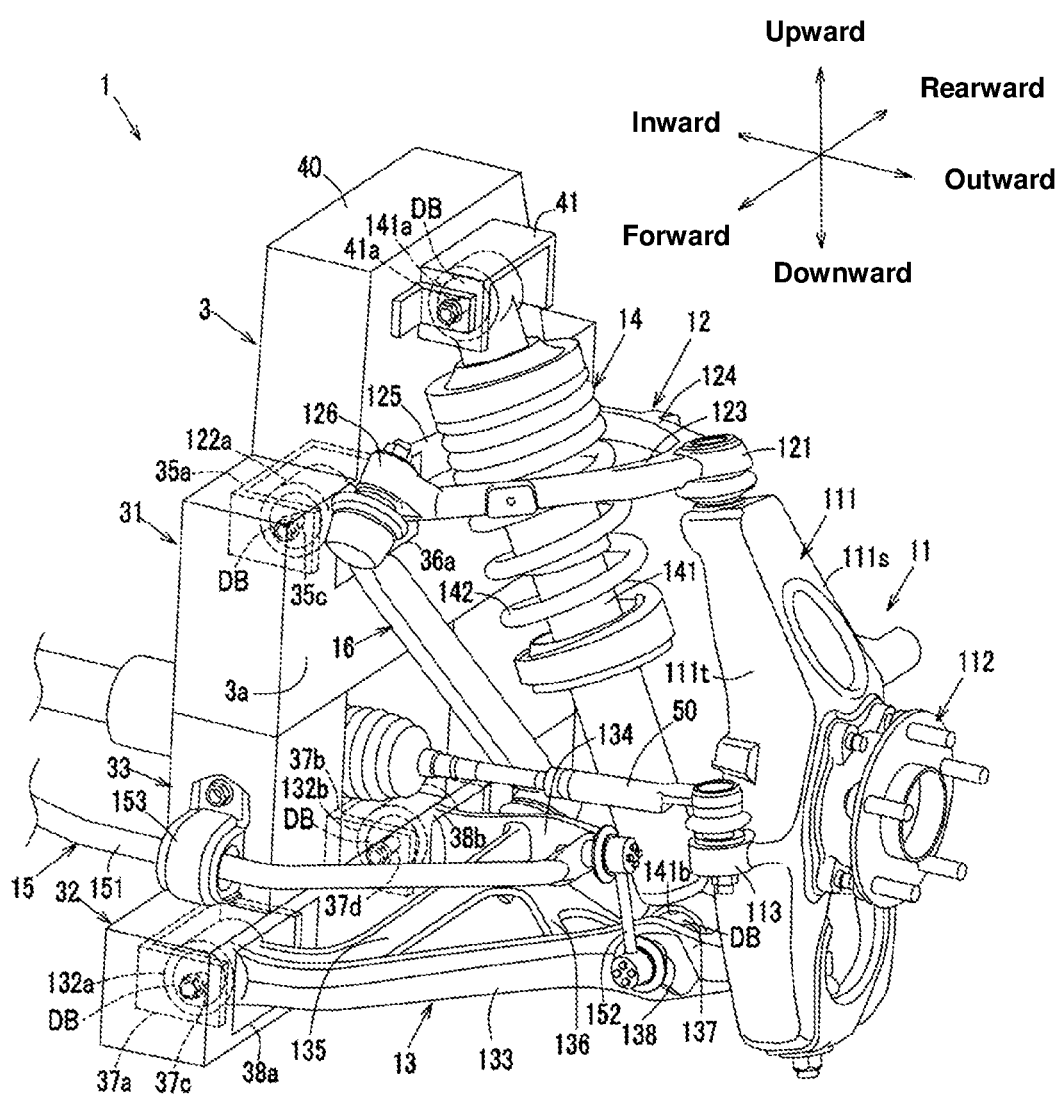
FIG. 1 is a perspective view showing a suspension device for a vehicle.

An embodiment of the present invention will be described referring to the drawings. A suspension device 1 for a vehicle according to the embodiment will be described referring to FIGS. 1-5. The suspension device 1 is a double wishbone type of suspension device which is applicable to a vehicle, such as an automotive vehicle. Hereafter, a case where the suspension device 1 is applied to a front suspension will be described specifically.

In FIG. 1 and others, directional terms of "forward," "rearward," "inward," "outward," "upward," and "downward" which are shown by arrows mean a vehicle forward side, a vehicle rearward side, an inward side in a vehicle width direction, an outward side in the vehicle width direction, a vehicle upward side, and a vehicle downward side, respectively.

Figure 2:
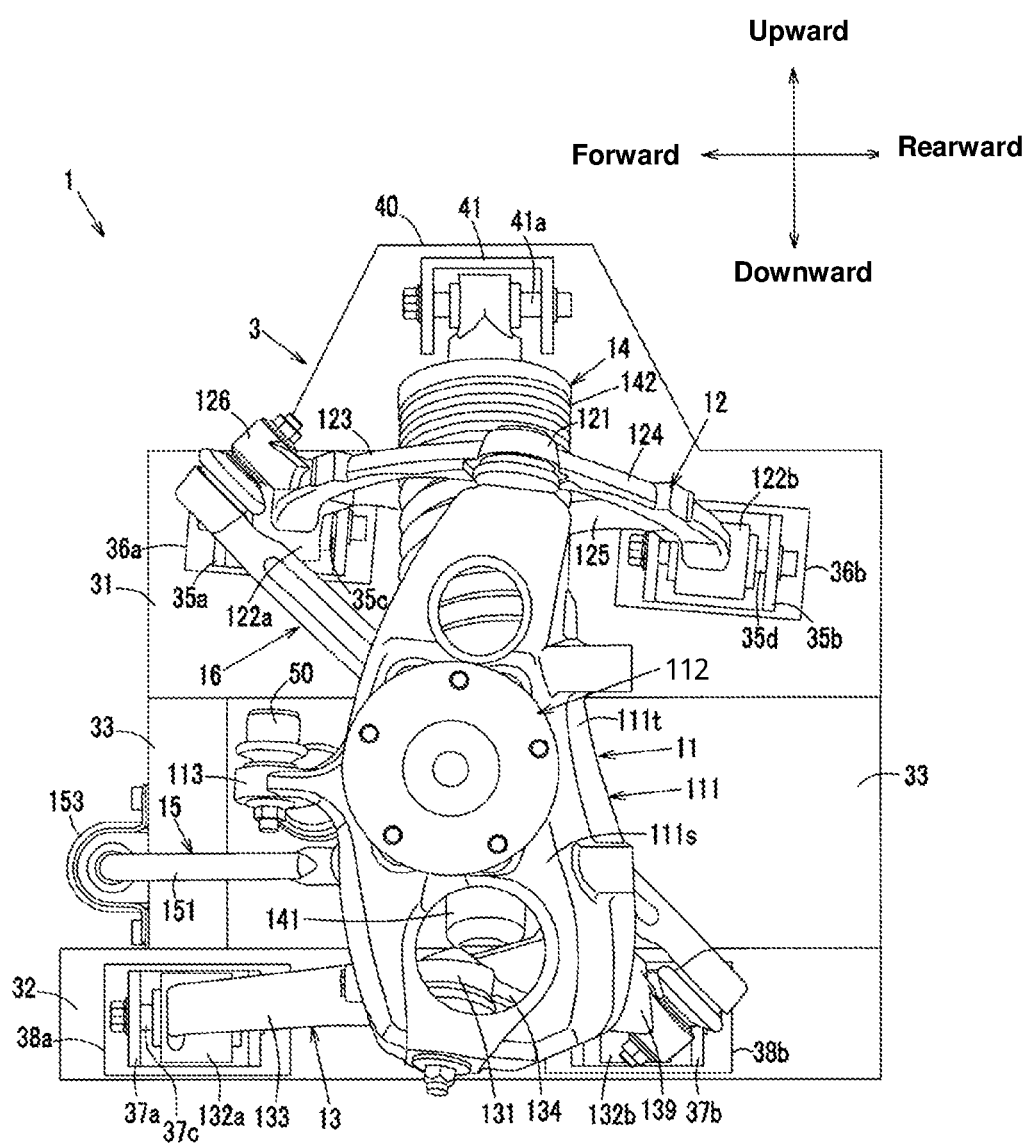
FIG. 2 is a side view of the suspension device for the vehicle, when viewed from a wheel side.

As shown in FIGS. 1 and 2, the suspension device 1 for the vehicle comprises a coupling rod 16 which couples an upper arm 12 and a lower arm 13 which support an upper portion and a lower portion of a knuckle 11 so as to rotatably support a wheel. The coupling rod 16 is configured to slant in a vehicle longitudinal direction.

<Vehicle-Body Front Portion>

As shown in FIGS. 1 and 2, the suspension device 1 for the vehicle is attached to a side face 3a of each of right-and-left both sides (i.e., the outward side in the vehicle width direction) of a vehicle-body front portion 3. Herein, FIG. 1 illustrates a left-side part of the vehicle-body front portion 3 only. The vehicle-body front portion 3 comprises a pair of right-and-left front side frames 31, a pair of right-and-left side members 32, and connecting members 33 which interconnect the front side frames 31 and the side members 32.

The front side frames 31, which are bar-shaped members extending in the vehicle longitudinal direction, are arranged at right-and-left both sides of the vehicle-body front portion 3. The side members 32, which are bar-shaped members extending in the vehicle longitudinal direction, are arranged at the right-and-left both sides of the vehicle-body front portion 3, and positioned below the right-and-left front side frames 31 such that they are spaced apart from the front side frames 31, respectively. The connecting members 33 are provided at a forward side and a rearward side of an upper face of the side member 32. The side member 32 and the front side frame 31 are interconnected by the above-described connecting members 33. A suspension tower 40 which supports an upper end portion of a damper 14, which will be descried later, is provided at the upper face of the front side frame 31. An outward-side side face 3a, in the vehicle width direction, of the vehicle-body front portion 3 is constituted by respective outward-side side faces of the front side frame 31, the side member 32, the connecting members 33, and the suspension tower 40.

<Suspension Device for Vehicle>

Figure 3:
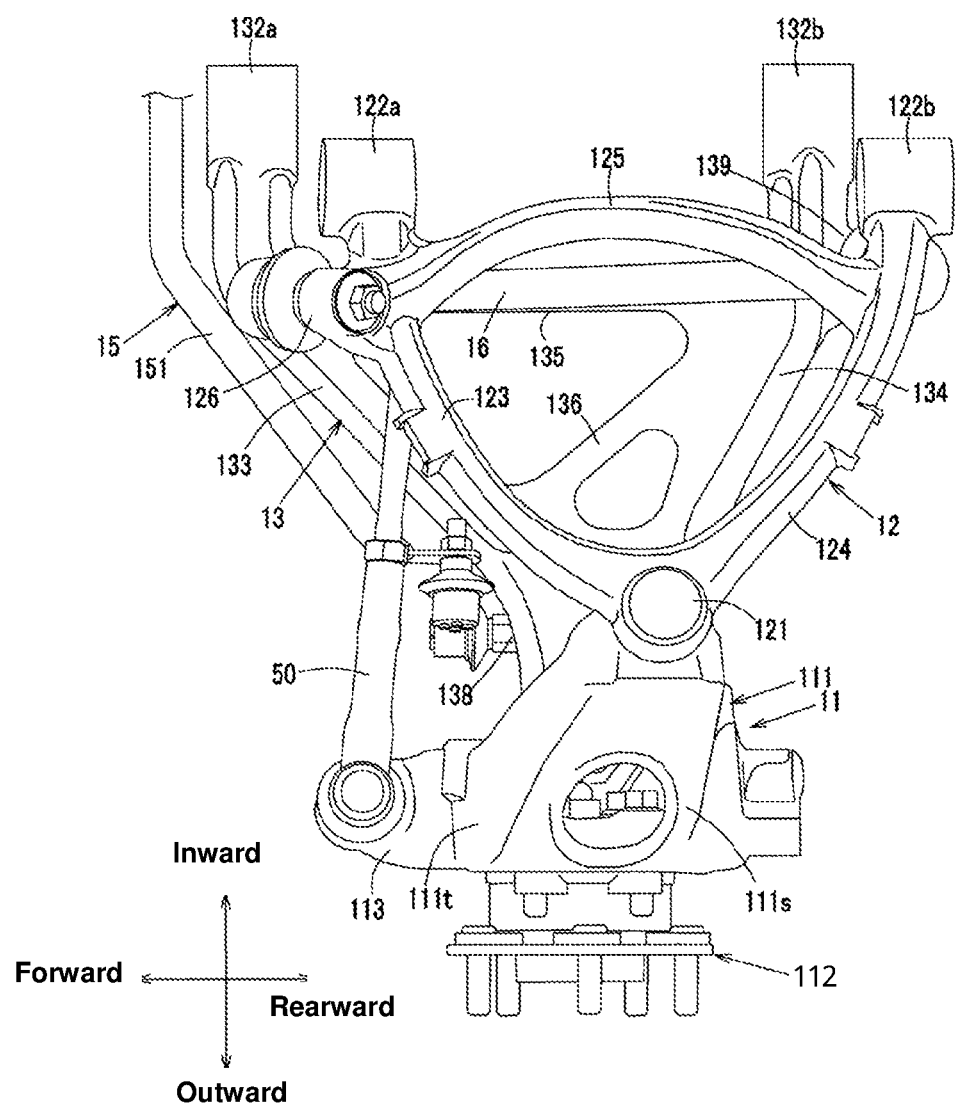
FIG. 3 is a plan view showing the suspension device for the vehicle (a damper is not illustrated).

As shown in FIGS. 1-3, the suspension device 1 for the vehicle comprises a knuckle 11 which supports the front wheel, an upper arm 12 which supports an upper portion of the knuckle 11, a lower arm 13 which supports a lower portion of the knuckle 11, a damper 14 which absorbs impact from a road surface, a stabilizer 15 which suppresses different vertical moves which may occur between the right-and-left suspension devices 1, and a coupling rod 16 which suppresses the upper arm 12 and the lower arm 13 from being displaced in an opposite direction of the longitudinal direction during braking.

<Upper Arm>

Figure 4:
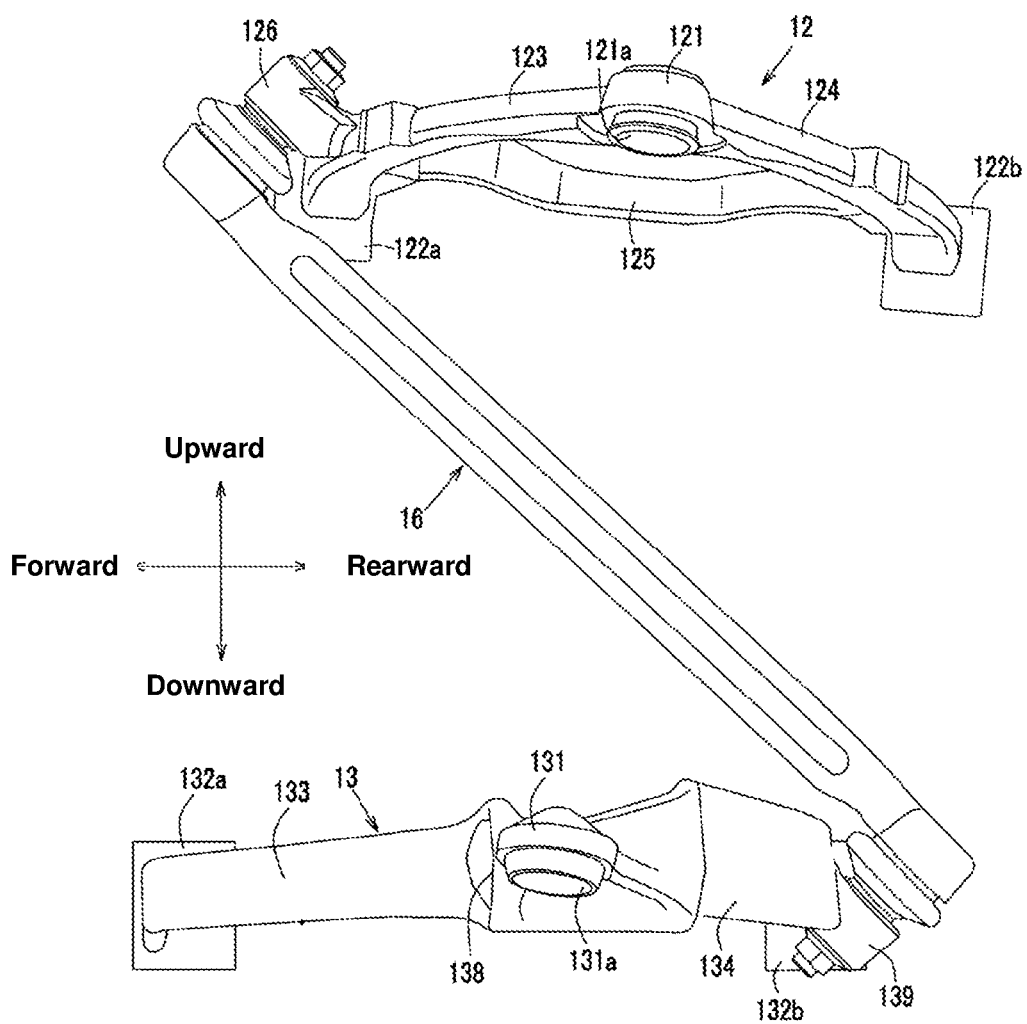
FIG. 4 is a side view showing an upper arm, a lower arm, and a coupling rod, when viewed from the wheel side.

As shown in FIGS. 3 and 4, the upper arm 12 is formed in a roughly A shape in the plan view, for example. The upper arm 12 is provided with a knuckle connection portion 121 which is connected to the upper portion of the knuckle 11, a pair of forward-and-rearward vehicle-body connection portions (a forward-side vehicle-body connection portion 122a and a rearward-side vehicle-body connection portion 122b) which are connected to an upper portion of the side face 3a of the vehicle-body front portion 3, a forward-side arm portion 123 which connects the knuckle connection portion 121 and the forward-side vehicle-body connection portion 122a, a rearward-side arm portion 124 connects the knuckle connection portion 121 and the rearward-side vehicle-body connection portion 122b, a connecting arm portion 125 which is provided to extend between the forward-side arm portion 123 and the rearward-side arm portion 124, and a coupling-rod connection portion 126 where a forward end portion of the coupling rod 16 is connected.

A recess portion 121a where a ball joint which is provided at the upper portion of the knuckle 11, which will be described later, is pivotally connected is provided at a lower face of the knuckle connection portion 121.

The vehicle-body connection portions 122a, 122b are connected to an upper portion of the side face 3a of the vehicle-body front face 3 (at an outward-side side face of the front side frame 31, for example) such that they are spaced apart from each other in the longitudinal direction and rotatable in the vertical direction (see FIGS. 1 and 2). More specifically, these vehicle-body connection portions 122a, 122b are configured to be tubal and their tubal axial lines are configured to extend coaxially in the vehicle longitudinal direction. A tubal resilient bush DB is coaxially fitted into each of the tubal vehicle-body connection portions 122a, 122b (see FIG. 1).

Meanwhile, as shown in FIGS. 1 and 2, a pair of support brackets (a forward-side support bracket 35a and a rearward-side support bracket 35b) which support the vehicle-body connection portions 122a, 122b rotatably in the vertical direction are provided at the upper portion of the side face 3a of the vehicle-body front face 3 (at the outward-side side face of the front side frame 31, for example).

The support brackets 35a, 35b support respective both end portions of rotational axial portions 35c, 35d which extend in the vehicle longitudinal direction. Each of the rotational axial portions 35c, 35d is inserted into a central hole of the resilient bush DB provided in each of the vehicle-body connection portions 122a, 122b of the upper arm 12. Each of the support bracket 35a, 35b is configured in a roughly U shape in the plan view such that its forward end portion and its rearward end portion are respectively bent outwardly in the vehicle width direction, and its forward end portion and its rearward end portion are connected to the forward end portion and the rearward end portion of each of the rotational axial portions 35c, 35d, whereby the respective both end portions (i.e., the above-described forward-and-rearward end portions) of the rotational axial portions 35c, 35d are supported.

The rotational axial portions 35c, 35d are provided coaxially and configured to slant forwardly and upwardly. Accordingly, the upper arm 12 is connected to the upper portion of the side face 3a of the vehicle-body front portion 3 in a slant state such that its forward side is located at a higher level than its rearward side.

More specifically, a pair of front-and-rear receiving recess portions (a forward-side receiving recess portion 36a and a rearward-side receiving recess portion 36b) are provided at the upper portion of the side face 3a of the vehicle-body front portion 3, for example (see FIGS. 1 and 2). The support brackets 35a, 35b are provided inside the receiving recess portions 36a, 36b, respectively.

The forward-side arm portion 123 extends obliquely outwardly and rearwardly, and is configured in a bar shape such that it is curved forwardly in a convex shape, for example. An outward-side end portion, in a longitudinal direction, of the forward-side arm portion 123 is connected to the knuckle connection portion 121, and an inward-side end portion, in the longitudinal direction, of the forward-side arm portion 123 is connected to the forward-side vehicle-body connection portion 122a.

The rearward-side arm portion 124 extends obliquely outwardly and forwardly, and is configured in a bar shape such that it is curved rearwardly in a convex shape, for example. An outward-side end portion, in a longitudinal direction, of the rearward-side arm portion 124 is connected to the knuckle connection portion 121, and an inward-side end portion, in the longitudinal direction, of the rearward-side arm portion 124 is connected to the rearward-side vehicle-body connection portion 122b.

The connecting arm portion 125 extends in the vehicle longitudinal direction, and is configured in a bar shape such that it is curved inwardly in a convex shape, for example. A forward-side end portion, in a longitudinal direction, of the connecting arm portion 125 is connected to the vicinity of the inward-side end portion, in the longitudinal direction, of the forward-side arm portion 123, and an rearward-side end portion, in the longitudinal direction, of the connecting arm portion 125 is connected to the vicinity of the inward-side end portion, in the longitudinal direction, of the rearward-side arm portion 124.

The coupling-rod connection portion 126 is provided at a forward side of the forward-side arm portion 123 of the upper arm 12. More specifically, the coupling-rod connection portion 126 is provided near the inward-side end portion, in the longitudinal direction, of the forward-side arm portion 123. In other words, the coupling-rod connection portion 126 is provided in front of a connection portion of the forward-side arm portion 123 and the connection arm portion 125.

Figure 5:
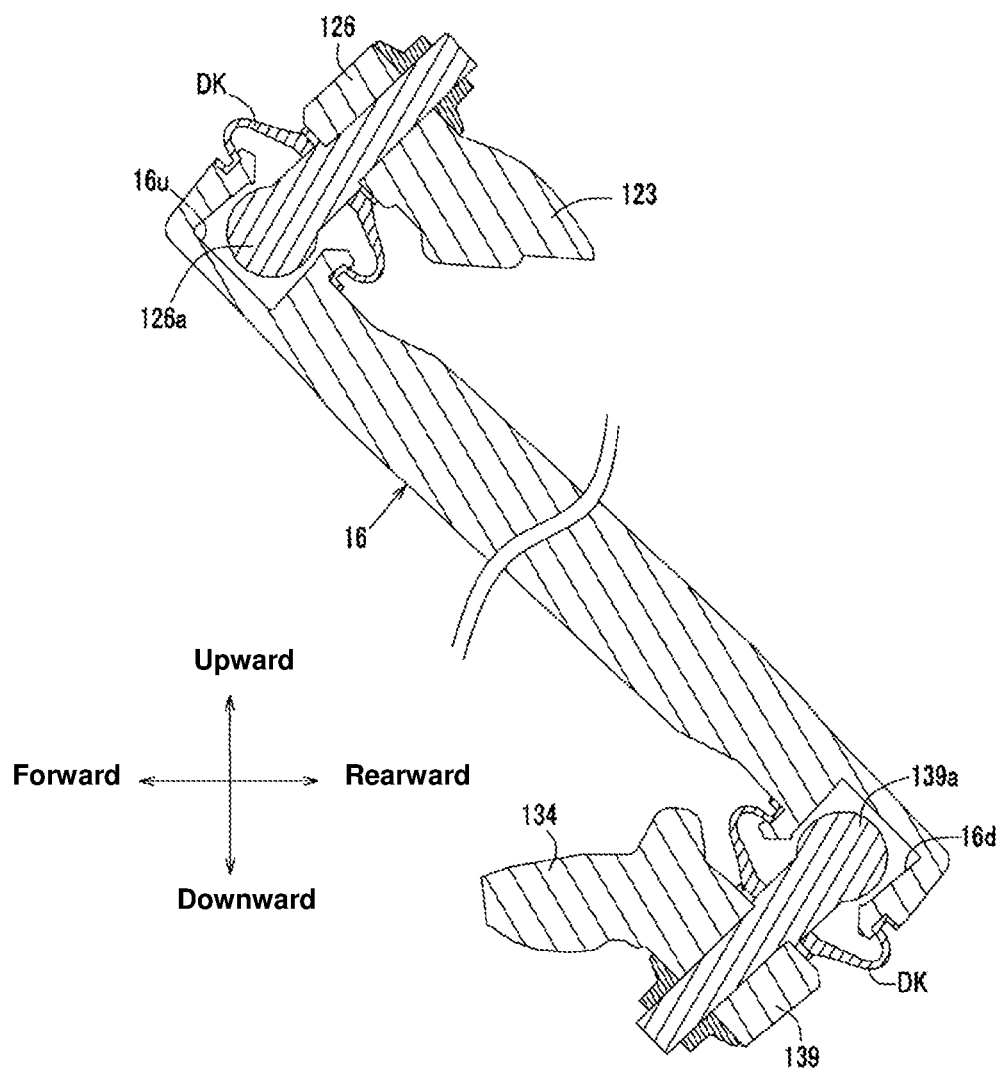
FIG. 5 is a sectional view of FIG. 4.

Further, the coupling-rod connection portion 126 protrudes obliquely forwardly and upwardly, and a ball joint 126a where the forward end portion of the coupling rod 16 is connected is provided at a lower face of the coupling-rod connection portion 126 (see FIG. 5). By configuring the coupling-rod connection portion 126 to protrude obliquely forwardly and upwardly as described above, the coupling-rod connection portion 126 is arranged substantially in parallel to the coupling rod 16 which is configured in a linear-bar shape, which will be described later, so that a connection angle of the coupling rod 16 and the coupling-rod connection portion 126 where the forward end portion of the coupling rod 16 is connected to the coupling-rod connection portion 126 can be made to fall in an appropriate range. That is, the forward end portion of the coupling rod 16 can be connected to the coupling-rod connection portion 126 so that the coupling rod 16 can rotate not only in the vehicle width direction but also in the vehicle longitudinal direction.

The upper arm 12 configured above is vertically rotatably connected to the side face 3a of the vehicle-body front portion 3 by rotatably supporting the vehicle-body connection portions 122a, 122b at the support brackets 35a, 35b.

<Lower Arm>

As shown in FIGS. 3 and 4, the lower arm 13 is formed in a roughly A shape in the plan view, for example. The lower arm 13 is provided with a knuckle connection portion 131 which is connected to the lower portion of the knuckle 11, a pair of forward-and-rearward vehicle-body connection portions (a forward-side vehicle-body connection portion 132a and a rearward-side vehicle-body connection portion 132b) which are connected to a lower portion of the side face 3a of the vehicle-body front portion 3, a forward-side arm portion 133 which connects the knuckle connection portion 131 and the forward-side vehicle-body connection portion 132a, a rearward-side arm portion 134 which connects the knuckle connection portion 131 and the rearward-side vehicle-body connection portion 132b, a connecting arm portion 135 and a slant connection portion 136 which are provided to extend between the forward-side arm portion 133 and the rearward-side arm portion 134, a damper connection portion 137 which is connected to a lower end portion of the damper 14, a stabilizer connection portion 138 where an end portion of the stabilizer 15 is connected, and a coupling-rod connection portion 139 where the lower end portion of the coupling rod 16 is connected.

A recess portion 131a where a ball joint which is provided at the lower portion of the knuckle 11, which will be described later, is pivotally connected is provided at a lower face of the knuckle connection portion 131.

The vehicle-body connection portions 132a, 132b are connected to a lower portion of the side face 3a of the vehicle-body front face 3 such that they are spaced apart from each other in the longitudinal direction and rotatable in the vertical direction (see FIGS. 1 and 2). More specifically, these vehicle-body connection portions 132a, 132b are configured to be tubal and their tubal axial lines are configured to extend coaxially in the vehicle longitudinal direction. A tubal resilient bush DB is coaxially fitted into each of the tubal vehicle-body connection portions 132a, 132b (see FIG. 1).

Meanwhile, as shown in FIGS. 1 and 2, a pair of support brackets (a forward-side support bracket 37a and a rearward-side support bracket 37b) which support the vehicle-body connection portions 132a, 132b rotatably in the vertical direction are provided at the lower portion of the side face 3a of the vehicle-body front face 3 (at the outward-side side face of the front side frame 32, for example).

The support brackets 37a, 37b support rotational axial portions 37c, 37d which extend in the vehicle longitudinal direction. Each of the rotational axial portions 37c, 37d is inserted into a central hole of the resilient bush DB provided in each of the vehicle-body connection portions 132a, 132b of the lower arm 13. Each of the support brackets 37a, 37b is configured in a roughly U shape in the plan view such that its forward end portion and its rearward end portion are respectively bent outwardly in the vehicle width direction, and its forward end portion and its rearward end portion are connected to the forward end portion and the rearward end portion of each of the rotational axial portions 37c, 37d, whereby the respective both end portions (i.e., the above-described forward-and-rearward end portions) of the rotational axial portions 37c, 37d are supported.

The rotational axial portions 37c, 37d are provided coaxially and in parallel to the vehicle longitudinal direction, for example. Accordingly, the lower arm 13 is connected to the lower portion of the side face 3a of the vehicle-body front portion 3 in a parallel state to the vehicle longitudinal direction.

More specifically, a pair of front-and-rear receiving recess portions (a forward-side receiving recess portion 38a and a rearward-side receiving recess portion 38b) are provided at the lower portion of the side face 3a of the vehicle-body front portion 3, for example (see FIGS. 1 and 2). The support brackets 37a, 37b are provided inside the receiving recess portions 38a, 38b, respectively.

The forward-side arm portion 133 is configured in a bar shape such that it extends obliquely outwardly and rearwardly. More specifically, the forward-side arm portion 133 is configured to extend outwardly from the side of the forward-side vehicle-body connection portion 132a substantially in parallel to the vehicle width direction, to bend and extend obliquely rearwardly, and then to bend and extend outwardly substantially in parallel to the vehicle width direction. An outward-side end portion, in a longitudinal direction, of the forward-side arm portion 133 is connected to the knuckle connection portion 131, and an inward-side end portion, in the longitudinal direction, of the forward-side arm portion 133 is connected to the forward-side vehicle-body connection portion 132a.

The rearward-side arm portion 134 is configured in a bar shape such that it extends obliquely outwardly and forwardly. More specifically, the rearward-side arm portion 134 is configured to extend outwardly from the side of the rearward-side vehicle-body connection portion 132b substantially in parallel to the vehicle width direction, to bend and extend obliquely forwardly, to bend and extend outwardly substantially in parallel to the vehicle width direction, and then bend and extend obliquely forwardly. An outward-side end portion, in a longitudinal direction, of the rearward-side arm portion 134 is connected to the knuckle connection portion 131, and an inward-side end portion, in the longitudinal direction, of the rearward-side arm portion 134 is connected to the rearward-side vehicle-body connection portion 132b.

That is, a distance between the forward-side arm portion 133 and the rearward-side arm portion 134 (i.e., a width, in the longitudinal direction, of the lower arm 13) is configured to be relatively narrow on the side of the knuckle connection portion 131, be relatively wide on the side of the vehicle-body connection portions 132a, 132b, and become gradually narrower toward the side of the knuckle connection portion 131 in a middle area between the knuckle connection portion 131 and the vehicle-body connection portions 132a, 132b.

The connecting arm portion 135 is configured in a bar shape such that it extends in the vehicle longitudinal direction. A forward-side end portion, in a longitudinal direction, of the connecting arm portion 135 is connected to the vicinity of the inward-side end portion, in the longitudinal direction, of the forward-side arm portion 133 and a rearward-side end portion, in the longitudinal direction, of the connecting arm portion 135 is connected to the vicinity of an inward-side end portion, in the longitudinal direction, of the rearward-side arm portion 134.

The slant connection portion 136 is configured in a slender flat-plate shape such that it extends obliquely forwardly and outwardly, for example. A forward-side end portion, in a longitudinal direction, of the slant connection portion 136 is connected to a center, in the longitudinal direction, of the forward-side arm portion 133, and a rearward-side end portion, in the longitudinal direction, of the slant connection portion 136 is connected to the vicinity of an inward-side end portion, in the longitudinal direction, of the rearward-side arm portion 134.

The damper connection portion 137 is provided at a narrow portion of the lower arm 13 which is positioned near the knuckle connection portion 131 (see FIG. 1). The damper connection portion 137 is provided with a rotational axial portion (not illustrated) which rotatably supports the lower end portion of the damper 14. The above-described rotational axial portion extends in the longitudinal direction, and its forward end portion and its rearward end portion are respectively connected to a portion which constitutes a forward part of the above-described narrow portion of the forward-side arm portion 133 and a portion which constitutes a rearward part of the above-described narrow portion of the rearward-side arm portion 134.

The stabilizer connection portion 138 is provided near the knuckle connection portion 131 of a forward side of the forward-side arm portion 133 of the lower arm 13.

The coupling-rod connection portion 139 is provided at the rearward side of the rearward-side arm portion 134 of the lower arm 13. That is, the coupling-rod connection portion 139 is provided at a portion of the lower arm 13 which is positioned on an opposite side to the stabilizer connection portion 138. Further, the coupling-rod connection portion 139 is provided near the inward-side end portion, in the longitudinal direction, of the rearward-side arm portion 134. That is, the coupling-rod connection portion 139 is provided at a rearward side of a connection portion of the rearward-side arm portion 134 and the connection arm portion 135.

Further, the coupling-rod connection portion 139 protrudes obliquely rearwardly and downwardly, and a ball joint 139a where a rearward end portion of the coupling rod 16 is connected is provided at an upper face of the coupling-rod connection portion 139 (see FIG. 5). By configuring the coupling-rod connection portion 139 to protrude obliquely rearwardly and downwardly as described above, the coupling-rod connection portion 139 is arranged substantially in parallel to the coupling rod 16 which is configured in the linear-bar shape, which will be described later, so that a connection angle of the coupling rod 16 and the coupling-rod connection portion 139 where the rearward end portion of the coupling rod 16 is connected to the coupling-rod connection portion 139 can be made to fall in an appropriate range. That is, the forward end portion of the coupling rod 16 can be connected to the coupling-rod connection portion 139 so that the coupling rod 16 can rotate not only in the vehicle width direction but also in the vehicle longitudinal direction.

The lower arm 13 configured above is vertically rotatably connected to the side face 3a of the vehicle-body front portion 3 by rotatably supporting the vehicle-body connection portions 132a, 132b at the support brackets 37a, 37b.

<Knuckle>

As shown in FIGS. 1-3, the knuckle 11 comprises a knuckle body 111, a hub 112 which rotatably supports the front wheel, and a steering-rod connection portion 113 where a steering rod 50 extending from a steering mechanism, not illustrated, is connected. The steering rod 50 is a rod for rotating the knuckle 11 in the vehicle lateral direction.

The knuckle body 111 comprises a main plate portion 111s which is directed in the vehicle width direction and a peripheral wall portion lilt which is provided to stand inwardly, in the vehicle width direction, from a peripheral edge of the main plate portion 111s, for example. The main plate portion 111s is configured to be vertically long and slants such that its upper portion is positioned inwardly in the vehicle width direction.

A ball joint is provided at an upper portion (an upper face of an upper end portion of the peripheral wall portion lilt, for example) of the knuckle body 111, and this ball joint is pivotally connected inside the recess portion 121a of the lower face of the knuckle connection portion 121 of the upper arm 12. A ball joint is provided at a lower portion (an upper face of a lower end portion of the peripheral wall portion lilt, for example) of the knuckle body 111, and this ball joint is pivotally connected inside the recess portion 131a of the lower face of the knuckle connection portion 131 of the lower arm 13.

Thus, the knuckle 11 is supported at the vehicle body via the arms 12, 13 rotatably vertically and also in the vehicle lateral direction by the ball joints provided at the upper portion and the lower portion of the knuckle 11 which are pivotally connected inside the recess portions 121a, 131a of the knuckle connection portions 121, 131 of the respective arms 12, 13.

The hub 112 is rotatably connected to a center, in the vertical direction and in the longitudinal direction, of the knuckle body 111, for example, at an outward-side side face, in the vehicle width direction, of the knuckle body 111 (i.e., an outward-side main face, in the vehicle width direction, of the main plate portion 111s), for example.

The steering-rod connection portion 113 is provided at a center, in the vertical direction, of a forward end of the knuckle body 111 such that it protrudes forwardly, for example. That is, the steering-rod connection portion 113 is positioned on the opposite side, in the longitudinal direction, to the coupling-rod connection portion 139 relative to the center, in the longitudinal direction, of the knuckle 11. A ball joint is provided at an upper face of the steering-rod connection portion 113, for example, and a tip portion of the steering rod 50 is pivotally connected to this ball joint.

<Damper>

As shown in FIG. 1, the damper 14 comprises a damper body 141 which is expandable in its longitudinal direction and a spring 142 which is arranged around an upper half part of the damper body 141 so as to bias the damper body 141 in its expansion direction.

The damper 14 is provided to be inserted into an opening portion which is enclosed by the respective arms (the forward-side arm portion 123, the rearward-side arm portion 124, and the connection arm portion 125). An upper end portion of the damper body 141 is connected to the upper end portion of the side face 3a of the vehicle-body front portion 3, and a lower end portion of the damper body 141 is connected to the damper connection portion 137 of the lower arm 13.

More specifically, at the upper end portion and the lower end portion of the damper body 141 are provided penetration holes 141a, 141b which extend in the vehicle longitudinal direction, and tubal resilient bushes DB are fit into the penetration holes 141a, 141b.

Meanwhile, the suspension tower 40 is provided to stand at an upper portion of each of the right-and-left both sides of the vehicle-body front portion 3 (i.e., an upper portion of each of the front side frames 31). A support bracket 41 which supports the upper end portion of the damper body 141 is provided at an outward-side side face, in the vehicle width direction, of the damper body 141 (i.e., the upper end portion of the side face 3a of the vehicle-body front portion 3).

The support bracket 41 supports both end portions of rotational axial portion 41a which extends in the vehicle longitudinal direction. The rotational axial portion 41a is rotatably inserted into a center of the resilient bush DB fitted into the penetration hole 141a of the upper end portion of the damper body 141. The support bracket 41 is configured in a roughly U shape in the plan view such that its forward end portion and its rearward end portion are respectively bent outwardly in the vehicle width direction, and its forward end portion and its rearward end portion are connected to a forward end portion and a rearward end portion of the rotational axial portion 41a, whereby both end portions of the rotational axial portion 41a (i.e., the above-descried forward-and-rearward end portions) are supported. Thus, the upper end portion of the damper body 141 is supported by the support bracket 41, so that the upper end portion of the damper body 141 is connected to the upper end portion of the side face 3a of the vehicle-body front portion 3 rotatably in the vehicle width direction.

Meanwhile, the lower end portion of the damper body 141 is connected at the damper connection portion 137 rotatably in the vehicle width direction by inserting a rotational axial portion (not illustrated) extending in the longitudinal direction into a central hole of the resilient bush DB fitted into the penetration hole 141b and supporting forward-and-rearward both end portions of the above-described rotational axial portion at the damper connection portion 137 of the lower arm 13.

<Stabilizer>

As shown in FIG. 1, the stabilizer 15 comprises a stabilizer body 151 and a pair of bar-shaped link portions 152 which interconnect both ends of the stabilizer body 151 and the stabilizer connection portions 138 of the right-and-left lower arms 13. FIG. 1 illustrates a left-side link portion 152 only.

The stabilizer body 151 is a bar member which extends in the vehicle width direction, and configured such that both end portions, in a longitudinal direction, thereof extend obliquely outwardly and rearwardly. Both-side portions of a center, in the longitudinal direction, of the stabilizer body 151 are rotatably attached to the vehicle-body front portion with attaching parts 153. FIG. 1 illustrates the left-side link portion 152 only.

In this state, the both end portions, in the longitudinal direction, of the stabilizer 151 are arranged in front of and above the lower arms 13, and are configured to be rotatable in the vertical direction. Moreover, in this state, the both end portions, in the longitudinal direction, of the stabilizer 151 are connected to the stabilizer connection portions 138 of the lower arms 13 via the link portions 152.

<Coupling Rod>

As shown in FIGS. 3-5, the coupling rod 16 is configured in a linear-bar shape. At an upper face of a forward end portion, in a longitudinal direction, of the coupling rod 16 is provided a recess portion 16u, where a ball joint 126a which is provided at the coupling-rod connection portion 126 of the upper arm 12 is pivotally connected. At a lower face of a rearward end portion, in the longitudinal direction, of the coupling rod 16 is provided a recess portion 16d, where a ball joint 139a which is provided at the coupling-rod connection portion 139 of the lower arm 13 is pivotally connected.

Herein, reference character DK in FIG. 5 denotes resilient covers which cover over the ball joints 126a, 139a. The resilient covers DK are configured in a tubal shape, and arranged between end portions of the coupling rod 16 and the coupling-rod connection portions 126, 139 and attached around the ball joints 126a, 139a.

Thus, the coupling rod 16 is pivotally connected to the coupling-rod connection portion 126 of the upper arm 12 via the ball joint 126a at its forward end portion, and pivotally connected to the coupling-rod connection portion 139 of the lower arm 13 via the ball joint 139a at its rearward end portion. Accordingly, the coupling rod 16 which couples the upper arm 12 and the lower arm 13 is configured to slant such that its forward side is located at a higher level than its rearward side. Further, the coupling rod 16 is configured to be rotatable in a reverse direction according to the vertical rotation of the respective arms 12, 13. Thereby, the coupling rod 16 couples the respective arms 12, 13 without blocking the vertical rotation of the respective arms. Further, the coupling rod 16 is provided more closely to the vehicle body than the knuckles 11 of the respective arms 12, 13.

The suspension device 1 for the vehicle according to the present embodiment comprises the knuckle 11 supporting the wheel, the upper arm 12 vertically rotatably connected to the vehicle body and pivotally supporting the upper portion of the knuckle 11, the lower arm 13 provided below the upper arm 12 and vertically rotatably connected to the vehicle body, and the coupling rod 16 coupling the upper arm 12 and the lower arm 13, wherein the coupling rod 16 is configured to slant in the vehicle longitudinal direction and be rotatably connected to the upper arm 12 and the lower arm 13, respectively.

According to this structure, since the coupling rod 16 configured as described above is provided, the longitudinal-compliance securement (i.e. the mutual displacement, in the same direction of the vehicle longitudinal direction, of the respective arms 12, 13 is secured) and the caster-rigidity securement can be compatibly attained without damaging the suspension function.

More specifically, since the coupling rod 16 coupling the upper arm 12 and the lower arm 13 is configured to slant in the vehicle longitudinal direction, the upper arm 12 and the lower arm 13 can be suppressed from being displaced in the opposite direction of the vehicle longitudinal direction by the coupling rod 16 during the braking, so that the caster rigidity can be secured. Further, since it is unnecessary that the rubber bushes DB which are generally provided between the vehicle body and the vehicle-body connection portions 122a, 122b, 132a, 132b of the upper arm 12 and the lower arm 13 are designed to be hard, the longitudinal compliance of the suspension which is provided by the rubber bushes DB can be secured.

Moreover, since the coupling rod 16 is rotatably connected to the upper arm 12 and the lower arm 13, respectively, the coupling rod 16 can couple the upper arm 12 and the lower arm 13 without damaging the vertical rotation of the upper arm 12 and the lower arm 13 as the suspension function.

Further, since the coupling rod 16 is connected to the upper arm 2 and the lower arm 3 via the ball joints 126a, 139a, a movable range of the connection portions of the coupling rod 16 to the upper arm 12 and the lower arm 13 can be enlarged. That is, the connection portions of the coupling rod 16 can be moved not only around the axial line of the connection portions (around the axial line of the ball joints 126a, 139a) but also in the axial direction of the connection portions (i.e., in the vehicle longitudinal direction). Accordingly, the flexibility of a connection position or a connection angle where the coupling rod 16 is connected to the respective arms 12, 13 can be improved.

Moreover, since the coupling rod 16 is configured to couple the upper arm 12 and the lower arm 13 in the slant state where the forward side in the vehicle longitudinal direction, thereof is located at the higher level than the rearward side, in the vehicle longitudinal direction, thereof, the tensional load, not the bending load, can be applied to the coupling rod 16 during the braking where the upper arm 12 and the lower arm 13 are displaced in the opposite direction of the vehicle longitudinal direction, so that the weight reduction of the coupling rod 16 can be attained.

Also, since the forward end portion of the coupling rod 16 is connected to the forward side of the forward-side arm portion 123 of the upper arm 12, the coupling rod 16 which couples the upper arm 12 and the lower arm 13 can be configured to slant in the vehicle longitudinal direction more properly, so that the upper arm 12 and the lower arm 13 can be effectively suppressed from being displaced in the opposite direction of the vehicle longitudinal direction by the coupling rod 16.

Further, the rearward end portion of the coupling rod 16 is connected to the rearward side of the rearward-side arm portion 134 of the lower arm 13, the coupling rod 16 which couples the upper arm 12 and the lower arm 13 can be configured to slant in the vehicle longitudinal direction more properly, so that the upper arm 12 and the lower arm 13 can be effectively suppressed from being displaced in the opposite direction of the vehicle longitudinal direction by the coupling rod 16.

Moreover, the knuckle 11 is provided with the steering-rod connection portion 113 where the steering rod 50 for rotating the knuckle 11 in the vehicle lateral direction is connected, and the coupling-rod connection portion 139 of the lower arm 13 where the coupling rod 16 is connected is arranged on the opposite side, in the vehicle longitudinal direction, to the steering-rod connection portion 113 relative to the center, in the vehicle longitudinal direction, of the knuckle 11. Thereby, the coupling rod 16 can be connected to the lower arm 13 without interfering with the steering rod 50.

Also, since the lower arm 13 is provided with the stabilizer connection portion 138 where the stabilizer 15 is connected, and the coupling-rod connection portion 139 of the lower arm 13 where the coupling rod 16 is connected is arranged on the opposite side, in the vehicle longitudinal direction, to the stabilizer connection portion 138 of the lower arm 13, the coupling rod 16 can be connected to the lower arm 13 without interfering with the stabilizer 15.

Further, the coupling rod 16 is connected to the respective portions of the upper arm 12 and the lower arm 13 which are positioned more closely to the vehicle-body side than the knuckle side, respectively, it can be prevented that the weight of the coupling rod 16 improperly influences a smooth vertical move of the respective arms 12, 13.

Modified Example 1

Figure 6:
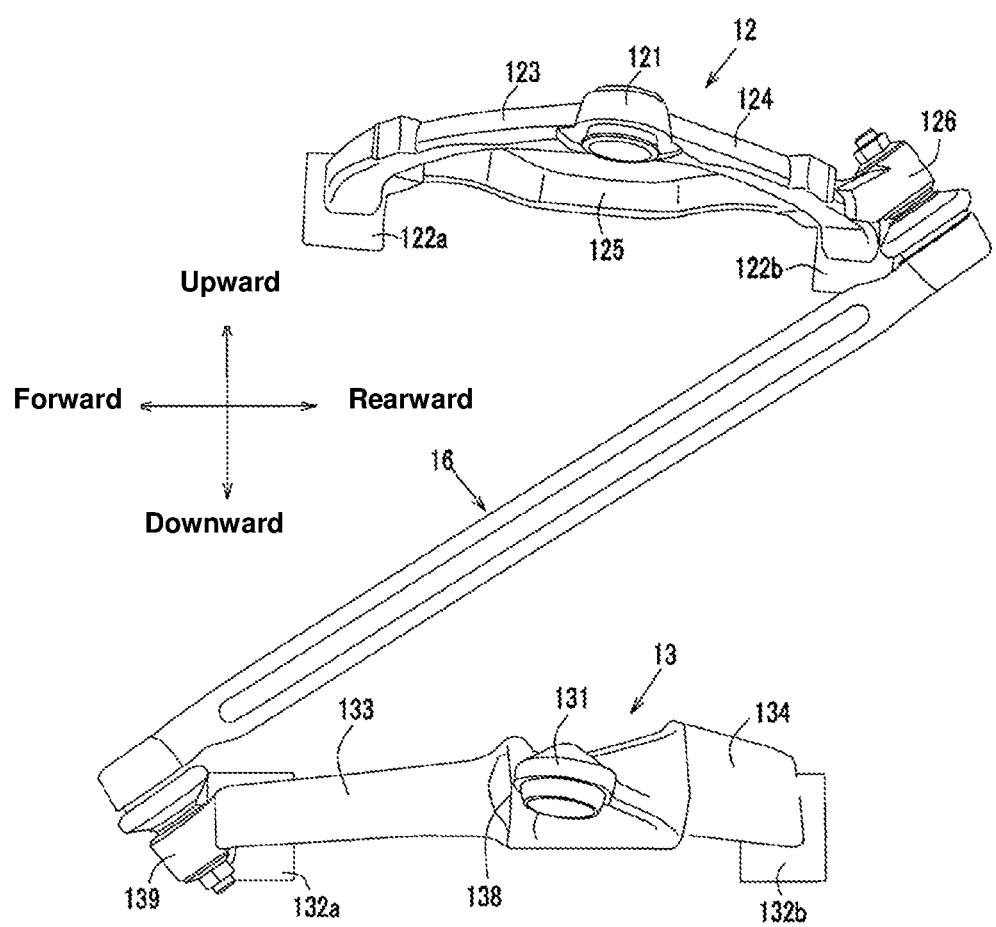
FIG. 6 is a side view showing a modified example of an attachment position of the coupling rod.

While the above-described embodiment describes the coupling rod 16 which is configured to couple the upper arm 12 and the lower arm 13 in the state where the forward side, in the vehicle longitudinal direction, thereof is located at the higher level than the rearward side, in the vehicle longitudinal direction, thereof, the coupling rod 16 may be configured to couple the upper arm 12 and the lower arm 13 in the state where the forward side, in the vehicle longitudinal direction, thereof is located at a lower level than the rearward side, in the vehicle longitudinal direction, thereof as shown in FIG. 6. In this case, the coupling-rod connection portion 126 of the upper arm 12 is provided at a rearward side of the rearward-side arm portion 124 of the upper arm 12. Further, the coupling-rod connection portion 139 of the lower arm 13 is provided at a forward side of the forward-side arm portion 133 of the lower arm 13. In this case, a compressive load is applied to the coupling rod 16 during the braking, so that the respective arms 12, 13 are suppressed from being displaced in the opposite direction of the vehicle longitudinal direction.

Herein, both of the coupling rod 16 positioned in the slant state where the forward side is located at the higher level than the rearward side and the coupling rod 16 positioned in the slant state where the forward side is located at the lower level than the rearward side may be configured to couple the respective arms 12, 13. In this case, these two coupling rods 16 are provided to be offset from each other in the vehicle width direction.

Modified Example 2

Figure 7:
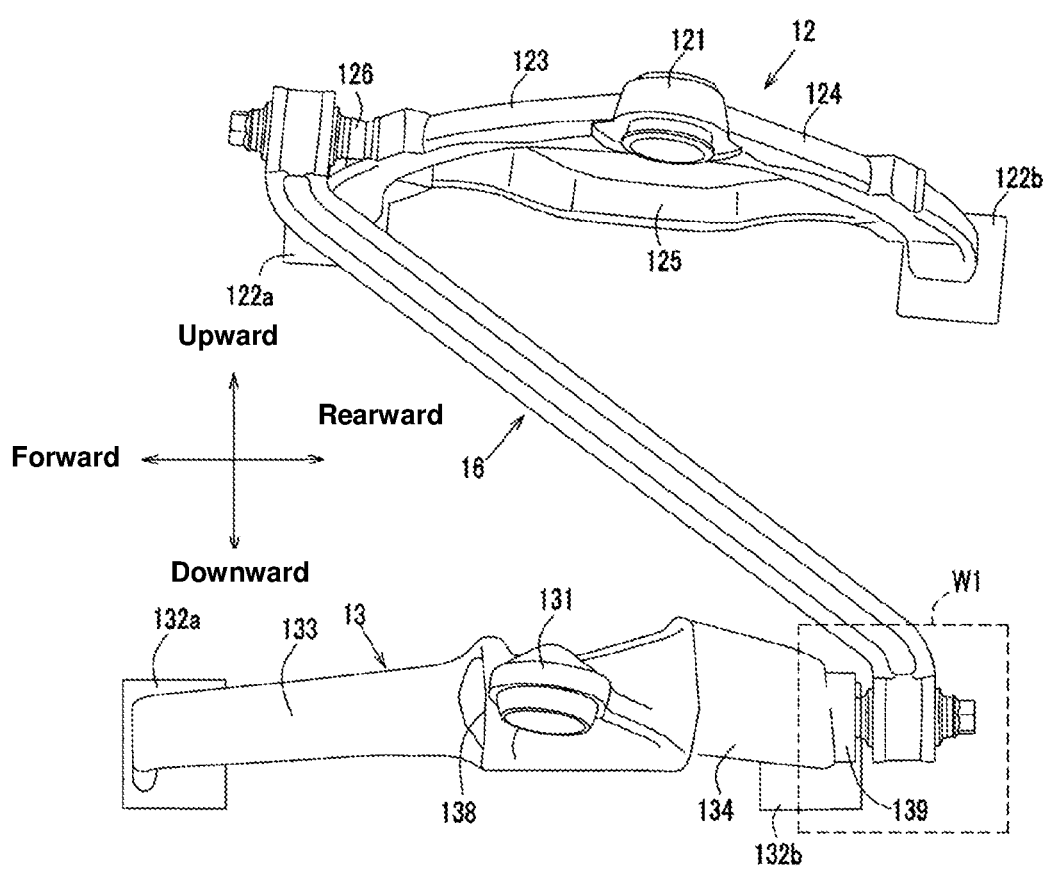
FIG. 7 is a side view showing another modified example relating to an angle of both end portions of the coupling rod.

In a modified example 2, as shown in FIG. 7, the coupling-rod connection portion 126 of the upper arm 12 is configured to project forwardly substantially horizontally from the forward side of the forward-side arm portion 123 of the upper arm 12, and its forward end face forms a roughly-vertical flat face which is directed toward the vehicle forward side. The coupling-rod connection portion 139 of the lower arm 13 is configured to project rearwardy substantially horizontally from the rearward side of the rearward-side arm portion 134 of the lower arm 13, and its rearward end face forms a roughly-vertical flat face which is directed toward the vehicle rearward side. The coupling rod 16 is configured substantially in a linear-bar shape, a forward end portion of which is bent upwardly and a rearward end portion of which is bent downwardly.

According to this modified example 2, by configuring the coupling rod 16 such that its forward end portion and its rearward end portion are bent upwardly and downwardly, respectively, the forward end portion and the rearward end portion of the coupling rod 16 can be arranged substantially in parallel to the forward end face of the coupling-rod connection portion 126 and the rearward end face of the coupling-rod connection portion 139. Thereby, a connection angle where the forward end portion and the rearward end portion of the coupling rod 16 are connected to the forward end face of the coupling-rod connection portion 126 and the rearward end face of the coupling-rod connection portion 139 can be made to fall in an appropriate range.

Figure 8:
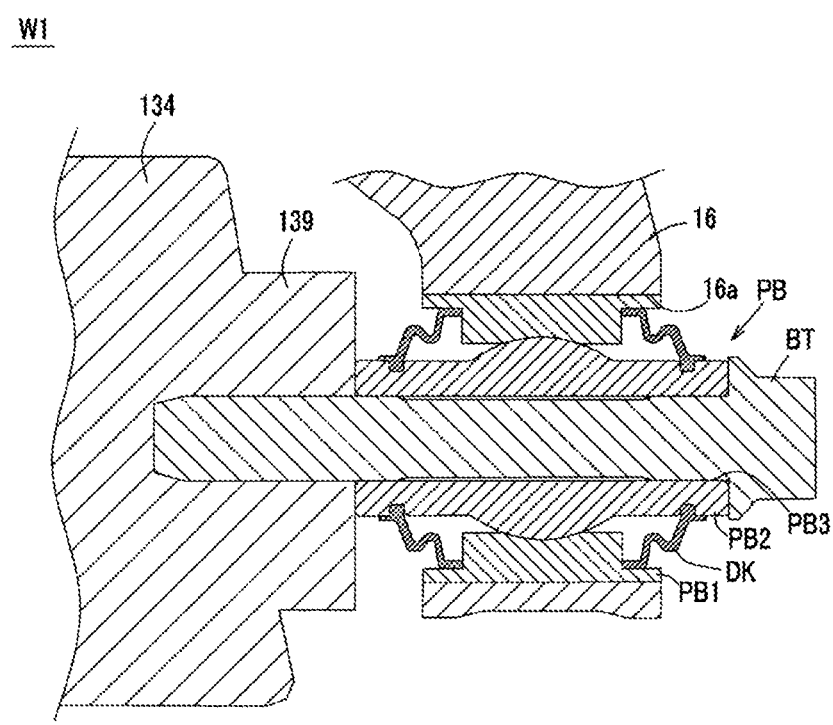
FIG. 8 is an enlarged sectional view showing a region W1 of FIG. 7.

Moreover, in the modified example 2, as shown in FIG. 8, the forward end portion and the rearward end portion of the coupling rod 16 are connected to the forward end face of the coupling-rod connection portion 126 and the rearward end face of the coupling-rod connection portion 139 via pillow balls PB in place of the ball joints 126a, 139a, respectively. That is, penetration holes 16a extending in the vehicle longitudinal direction are provided respectively at the forward end portion and the rearward end portion of the coupling rod 16, and the pillow balls PB are attached into the respective penetration holes 16a.

The pillow ball PB comprises a tubal pillow-ball receiving portion PB1 and a pillow-ball body PB2 which is pivotally attached into the pillow-ball receiving portion PB1. The pillow-ball receiving portion PB1 is attached into the penetration hole 16a of each of the forward end portion and the rearward end portion of the coupling rod 16. A penetration hole PB3 is provided at the center of the pillow-ball body PB2. Reference character DK shown in FIG. 8 denotes a resilient cover which covers over a connection portion of the pillow-ball receiving portion PB1 and the pillow-ball body PB2.

The pillow-ball body PB2 which is attached to the rearward end portion of the coupling rod 16 is fixed to the rearward end face of the coupling-rod connection portion 139 by a bolt BT which is inserted into the penetration hole PB3 being fixed roughly perpendicularly to the rearward end face of the coupling-rod connection portion 139 of the lower arm 13. Likewise, the pillow-ball body PB2 which is attached to the forward end portion of the coupling rod 16 is fixed to the forward end face of the coupling-rod connection portion 126. Thus, the forward end portion and the rearward end portion of the coupling rod 16 are pivotally connected to the coupling-rod connection portions 126, 139 via the pillow balls PB.

Herein, in the modified example 2 as well as the above-described embodiment, the forward end portion and the rearward end portion of the coupling rod 16 may be pivotally connected to the forward end face of the coupling-rod connection portion 126 and the rearward end face of the coupling-rod connection 139, respectively.

Modified Example 3

Figure 9:
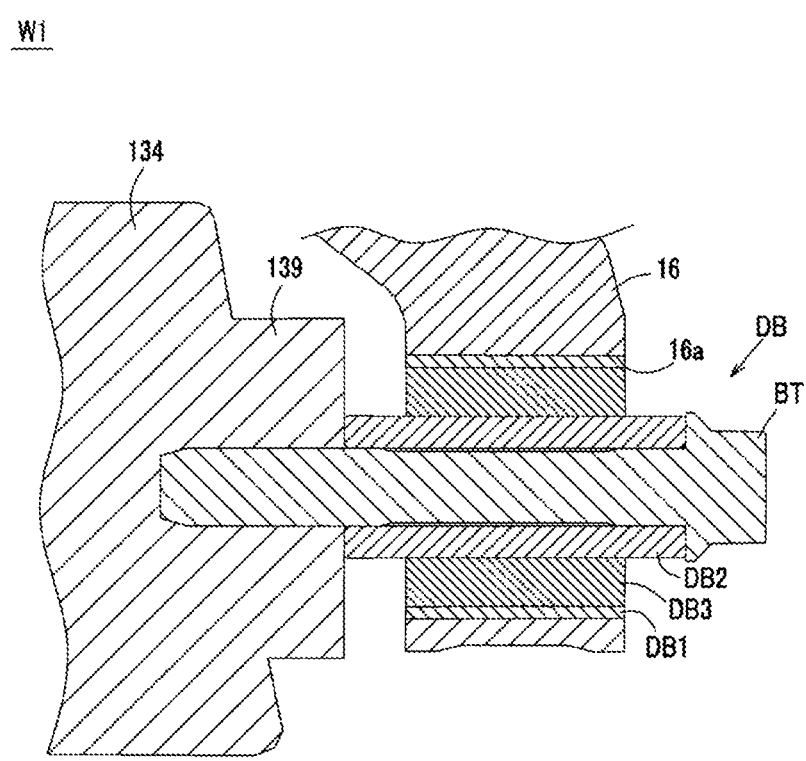
FIG. 9 is an enlarged sectional view showing another modified example of the region W1 of FIG. 7.

In the above-described modified example 2, a resilient bush DB is applicable in place of the pillow ball PB as shown in FIGS. 7 and 9. In this case, the resilient bushes DB are attached into the penetration holes 16a of the forward end portion and rearward end portion of the coupling rod 16 in place of the pillow balls PB. The resilient bush DB comprises an outer tubal portion DB1, an inner tubal portion DB2 which is coaxially arranged inside the outer tubal portion DB1, and a tubal resilient member DB3 which is provided between the outer tubal portion DB1 and the inner tubal portion DB2.

The resilient bush DB which is attached to the rearward end portion of the coupling rod 16 is fixed to the rearward end face of the coupling-rod connection portion 139 by a bolt BT which is inserted into the inner tubal portion DB2 being fixed roughly perpendicularly to the rearward end face of the coupling-rod connection portion 139 of the lower arm 13. Likewise, the resilient bush DB which is attached to the forward end portion of the coupling rod 16 is fixed to the forward end face of the coupling-rod connection portion 126. Thus, the forward end portion and the rearward end portion of the coupling rod 16 are respectively connected to the forward end face of the coupling-rod connection portion 126 and the rearward end face of the coupling-rod connection portion 139 via the resilient bushes DB.

Modified Example 4

Figure 10:
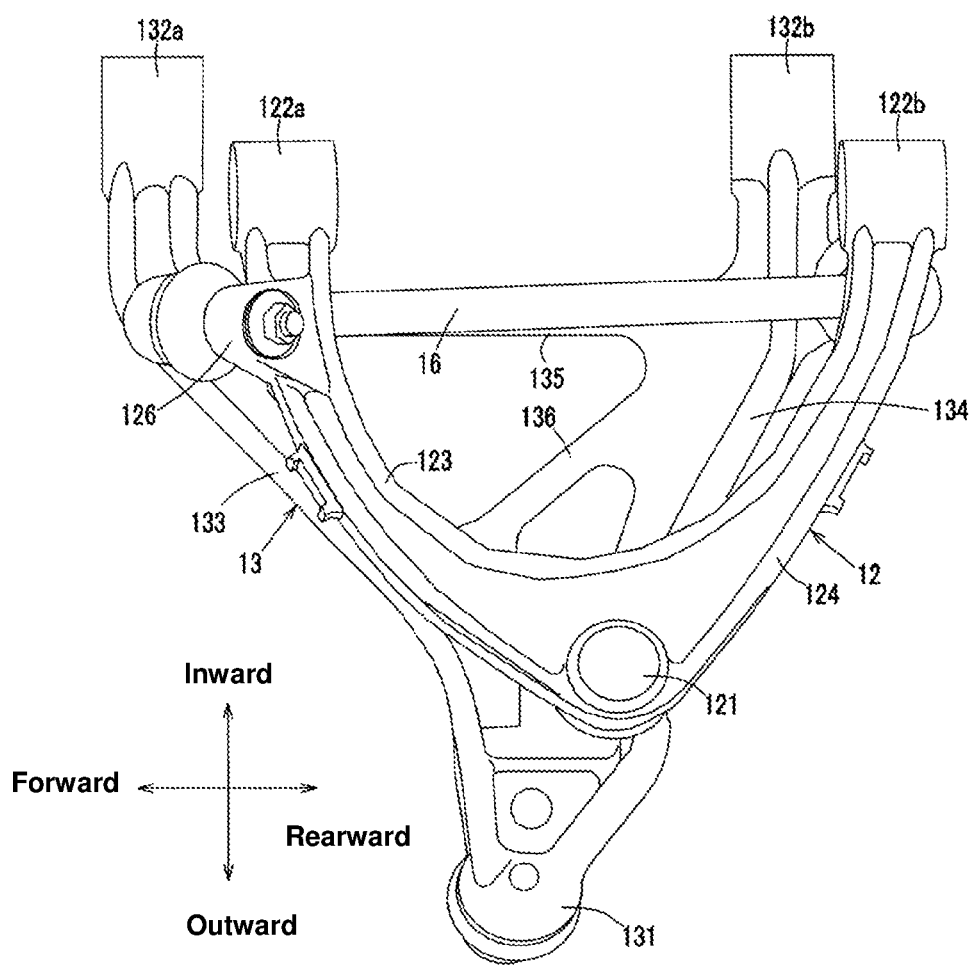
FIG. 10 is a plan view of a case where an upper arm is of a roughly V shape in a plan view.

While the upper arm 12 is configured in the roughly A shape in the plan view in the above-described embodiment, a roughly V-shaped upper arm 12 is applicable as shown in FIG. 10. In this case, the upper arm 12 corresponds to the one which is configured by omitting the connection arm portion 125 from the upper arm 12 of the above-described embodiment.

Modified Example 5

Figure 11:
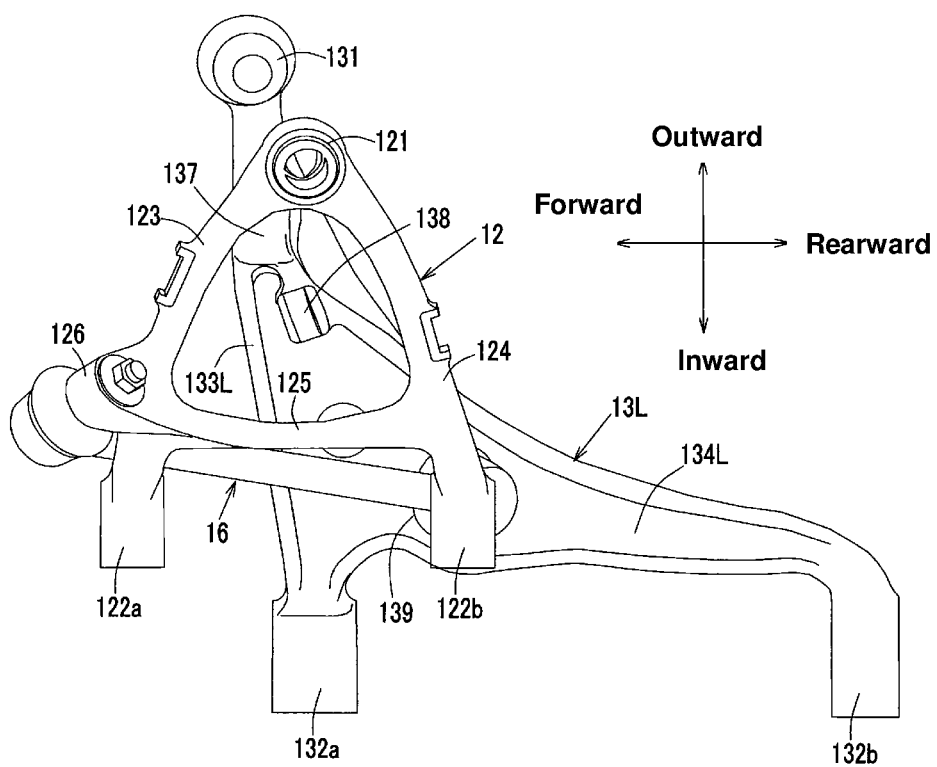
FIG. 11 is a plan view of another case where a lower arm is of a roughly L shape in the plan view.
Figure 12:
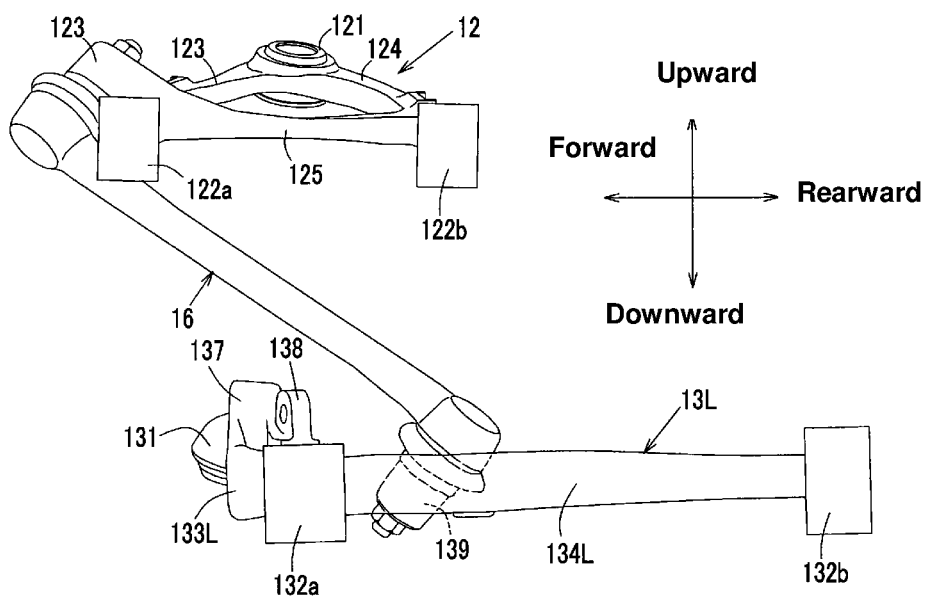
FIG. 12 is a side view of the case where the lower arm is of the roughly L shape in the plan view, when viewed from a side of a vehicle body.

While the lower arm 13 is configured in the roughly A shape in the plan view in the above-described embodiment, a roughly L-shaped lower arm 13L is applicable as shown in FIGS. 11 and 12. In this case, the lower arm 13L is provided with a knuckle connection portion 131 which is connected to the lower portion of the knuckle 11, a pair of front-and-rear vehicle-body connection portions (a forward-side vehicle-body connection portion 132a and a rearward-side vehicle-body connection portion 132b) which are connected to the lower portion of the side face 3a of the vehicle-body front portion 3, a lateral arm portion 133L which connects the knuckle connection portion 131 and the forward-side vehicle-body connection portion 132a, a vertical arm portion 134L which connects the lateral arm portion 133L and the rearward-side vehicle-body connection portion 132b, a damper connection portion 137 which is connected to a forked lower end portion of the damper 14, a stabilizer connection portion 138 where an end portion of the stabilizer 15 is connected, and a coupling-rod connection portion 139 where the lower end portion of the coupling rod 16 is connected. Herein, the knuckle connection portion 131, the forward-side vehicle-body connection portion 132a, and the rearward-side vehicle-body connection portion 132b are configured similarly to the above-described embodiment.

The lateral arm portion 133L is configured to extend in the vehicle width direction, and an outward-side end portion, in the vehicle width direction, thereof is connected to the knuckle connection portion 131 and an inward-side end portion, in the vehicle width direction, thereof is connected to the forward-side vehicle-body connection portion 132a. The vertical arm portion 134L is configured to extend rearwardly from the vicinity of an inward-side end portion, in a longitudinal direction, of the lateral arm portion 133L, and a rearward end portion, in a longitudinal direction, of the lateral arm portion 134L is bent inwardly in the vehicle width direction and connected to the rearward-side vehicle-body connection portion 132b. A width, in the vehicle width direction, of the vertical arm portion 134L is configured such that the width of its rearward side becomes gradually narrower.

The damper connection portion 137 is provided to stand at a position located on the inward side of the knuckle connection portion 131 of the lateral arm portion 133L. A penetration hole which penetrates substantially in the longitudinal direction is provided at the damper connection portion 137. A fastening member (a bolt, for example) is inserted into the penetration hole 141b of the lower end portion of the damper body 141 and fixed to the above-described penetration hole of the damper connection portion 137, whereby the lower end portion of the damper body 141 is connected to the damper connection portion 137 rotatably in the vehicle width direction.

The stabilizer connection portion 138 is provided to stand at a position near a center, in the longitudinal direction, of the lateral arm portion 133L (at a position inwardly adjacent to the damper connection portion 137, for example).

The coupling-rod connection portion 139 is provided at a position near a center, in the longitudinal direction, of the vertical arm portion 134L. The coupling-rod connection portion 139 is configured as a base portion which is configured to slant rearwardly. An upper end face of the coupling-rod connection portion 139 is configured to slant rearwardly and downwardly, where a ball joint (not illustrated) to which the lower end portion of the coupling rod 16 is connected roughly vertically is provided.

Since the upper end face of the coupling-rod connection portion 139 is configured to slant as described above, the above-described upper end face is substantially parallel to the coupling rod 16, so that a connection angle where the coupling rod 16 is connected to the coupling-rod connection portion 139 can be made to fall in an appropriate range.

In the modified example 5, the upper arm 12 is configured in the roughly A shape in the plan view similarly to the above-described embodiment. Further, the upper arm 12 is arranged slightly in front of the lower arm 13L in a state where the upper arm 12 and the lower arm 13L are connected to the side face 3a of the vehicle-body front portion 3. Accordingly, even if the coupling rod 16 is provided to couple the forward side of the forward-side arm portion 123 and the center, in the longitudinal direction, of the lower arm 13L, the connecting rod 16 can be configured to sufficiently slant in the vehicle longitudinal direction.

While the lower arm 13L is configured such that the lateral arm portion 133L is positioned on the vehicle forward side in the modified example 5, this arm 133L may be positioned on the vehicle rearward side. Moreover, while the lower arm 13L is configured in the roughly L shape in the plan view in the modified example 5, the upper arm 12 may be configured in the roughly L shape in the plan view or the both arms 12, 13L may be configured in the roughly L shape in the plan view.

The present invention should not be limited to the above-described embodiment and any other modifications or improvements may be applied within the scope of a spirit of the present invention.

What is claimed is:

1. A double wishbone suspension device for a vehicle, comprising:

a knuckle supporting a wheel;

an upper arm vertically rotatably connected to a vehicle body and pivotally supporting an upper portion of the knuckle;

a lower arm provided below the upper arm and vertically rotatably connected to the vehicle body; and a coupling rod coupling the upper arm and the lower arm, wherein said coupling rod is configured to slant in a vehicle longitudinal direction and be rotatably connected to the upper arm and the lower arm, respectively, said upper arm is provided with a coupling-rod connection portion where said coupling rod is connected, said coupling-rod connection portion of the upper arm is configured to project substantially horizontally from the upper arm, said lower arm is provided with a coupling-rod connection portion where said coupling rod is connected, said coupling-rod connection portion of the lower arm is configured to project substantially horizontally from the lower arm, and said coupling rod is configured substantially in a linear-bar shape, one end portion of which is bent toward the upper arm and the other end portion of which is bent toward the lower arm.

2. The suspension device for the vehicle of claim 1, wherein said coupling rod is connected to said upper arm and said lower arm, respectively, via a ball joint, a pillow ball, or a rubber bush.

3. The suspension device for the vehicle of claim 1, wherein said coupling rod is configured to couple said upper arm and said lower arm in a slant state where a forward side, in a vehicle longitudinal direction, thereof is located at a higher level than a rearward side, in the vehicle longitudinal direction, thereof.

4. The suspension device for the vehicle of claim 3, wherein said upper arm comprises a forward-side arm portion and a rearward-side arm portion, and a forward end portion of said coupling rod is connected to a forward side of said forward-side arm portion of the upper arm.

5. The suspension device for the vehicle of claim 3, wherein said lower arm comprises a forward-side arm portion and a rearward-side arm portion, and a rearward end portion of said coupling rod is connected to a rearward side of said rearward-side arm portion of the lower arm.

6. The suspension device for the vehicle of claim 1, wherein said coupling rod is configured to couple said upper arm and said lower arm in a slant state where a forward side, in a vehicle longitudinal direction, thereof is located at a lower level than a rearward side, in the vehicle longitudinal direction, thereof.

7. The suspension device for the vehicle of claim 6, wherein said upper arm comprises a forward-side arm portion and a rearward-side arm portion, and a rearward end portion of said coupling rod is connected to a rearward side of said rearward-side arm portion of the upper arm.

8. The suspension device for the vehicle of claim 6, wherein said lower arm comprises a forward-side arm portion and a rearward-side arm portion, and a forward end portion of said coupling rod is connected to a forward side of said forward-side arm portion of the lower arm.

9. The suspension device for the vehicle of claim 1, wherein said knuckle is provided with a steering-rod connection portion where a steering rod for rotating the knuckle in a vehicle lateral direction is connected, and a coupling-rod connection portion of said lower arm where said coupling rod is connected is arranged on an opposite side, in a vehicle longitudinal direction, to said steering-rod connection portion relative to a center, in the vehicle longitudinal direction, of the knuckle.

10. The suspension device for the vehicle of claim 1, wherein said lower arm is provided with a stabilizer connection portion where a stabilizer is connected, and a coupling-rod connection portion of said lower arm where said coupling rod is connected is arranged on an opposite side, in the vehicle longitudinal direction, to said stabilizer connection portion of the lower arm.

11. The suspension device for the vehicle of claim 1, wherein said coupling rod is connected to respective portions of said upper arm and said lower arm which are positioned more closely to a vehicle-body side than a knuckle side, respectively.

12. A double wishbone suspension device for a vehicle, comprising:
a knuckle supporting a wheel;
an upper arm vertically rotatably connected to a vehicle body and pivotally supporting an upper portion of the knuckle;
a lower arm provided below the upper arm and vertically rotatably connected to the vehicle body; and
a coupling rod coupling the upper arm and the lower arm, wherein
said coupling rod is configured to slant in a vehicle longitudinal direction and be rotatably connected to the upper arm and the lower arm, respectively,
said coupling rod is connected to respective portions of said upper arm and said lower arm which are positioned more closely to a vehicle-body side than a knuckle side, respectively,
said upper arm and said lower arm are each provided with a forward vehicle-body connection part and a rearward vehicle-body connection part, said forward vehicle-body connection parts and said rearward vehicle-body connection parts each being provided with a rubber bush, and
said forward vehicle-body connection parts and said rearward vehicle-body connection parts are spaced apart from each other in the vehicle longitudinal direction and are rotatable in a vertical direction, an axial line of each said vehicle-body connection part being configured to extend coaxially in the vehicle longitudinal direction.

* * * * *